United States Patent [19]
Robinson

[11] Patent Number: 5,277,266
[45] Date of Patent: Jan. 11, 1994

[54] SNOW TILLER TO HELP COOL THE ENGINE AND LUBRICATE THE TRACK OF A SNOWMOBILE

[76] Inventor: Jay Robinson, 647 N. 300 East, Richfield, Utah 84701

[21] Appl. No.: 839,902

[22] Filed: Feb. 21, 1992

[51] Int. Cl.$^5$ ............................................. B62D 55/24
[52] U.S. Cl. ...................................... 180/190; 305/14
[58] Field of Search ................ 180/190, 68.4; 305/12, 305/14

[56] References Cited

U.S. PATENT DOCUMENTS

| | | | |
|---|---|---|---|
| 3,897,839 | 8/1975 | Brisebois | 180/190 |
| 4,036,320 | 7/1977 | Rabehl | 180/190 |
| 4,076,089 | 2/1978 | Sanders | 180/190 |

Primary Examiner—Michael S. Huppert
Assistant Examiner—Anne E. Bidwell
Attorney, Agent, or Firm—Mallinckrodt & Mallinckrodt

[57] ABSTRACT

A snow tilling implement when mounted on a snowmobile and in operating position with the snowmobile in motion digs into the snow and sprays broken up snow on the heat exchanger, track, and slide rail on the underneath side of the snowmobile to cool and lubricate the same. The tilling implement can be simply an elongate rod, the proximal portion of which is advantageously bent to form a coil spring and catch arm. The catch arm abuts against the snowmobile and causes the coil spring to provide a downward force pressing the distal end of the rod into snow.

4 Claims, 2 Drawing Sheets

SNOW TILLER TO HELP COOL THE ENGINE AND LUBRICATE THE TRACK OF A SNOWMOBILE

BACKGROUND OF THE INVENTION

1. Field:

The present invention relates to snowmobiles and particularly to snowmobile cooling and track lubricating systems.

2. State of the Art:

Some snowmobiles have water cooled engines and a heat exchanger for dissipating heat from the engine coolant. The heat exchanger is usually located under the snowmobile where loose snow can be sprayed up onto the heat exchanger to cool it as the snowmobile moves through the snow. Also the track and slide rail of a snowmobile is cooled and lubricated by sprayed loose snow. The problem with such cooling and lubricating means is that when the snow is hard packed or icy, such as often occurs late in the snow season, there is no loose snow to be thrown onto the parts that need cooling and lubricating.

SUMMARY OF THE INVENTION

The present invention comprises a snow tilling implement for attachment to a snowmobile. The snowmobile drags the tilling implement through the snow, breaking up the snow and spraying it onto the elements of the snowmobile that require cooling and lubrication, such as the heat exchanger and the track and slide rail. In its simplest form, the tilling implement is an elongate rod member, the proximal portion of which is bent to form a coil spring and catch arm. The spring and catch arm abut against the snowmobile and provide a downward force for pressing the distal end of the implement into the snow. Attachment means in the form of a bolt, washer, and cylindrical member secures the implement. The cylindrical member is inserted in the coils of the spring and the washer covers the coils and encloses the cylinder within the coil while the bolt is inserted through the washer and cylindrical member to secure the assembly to the snowmobile. Preferably the attachment means allows the implement to swivel up into a resting position where it can be held out of the way when it is not needed as when snow is loose or powdery and to swivel down into an operating position in contact with the snow when needed as when snow is hard packed or icy.

THE DRAWINGS

The best mode presently contemplated for carrying out the invention is illustrated in the accompanying drawings, in which:

FIG. 1 is a somewhat schematic side elevation of a snowmobile having the snow tiller of the invention attached to it;

FIG. 2, a top plan view of the device of the invention shown in the resting position and drawn to a larger scale; and FIG. 3, a perspective view with of the elements of the device shown in place to the side of a snowmobile and about to be installed.

DETAILED DESCRIPTION OF THE ILLUSTRATED EMBODIMENT

Figure 1:
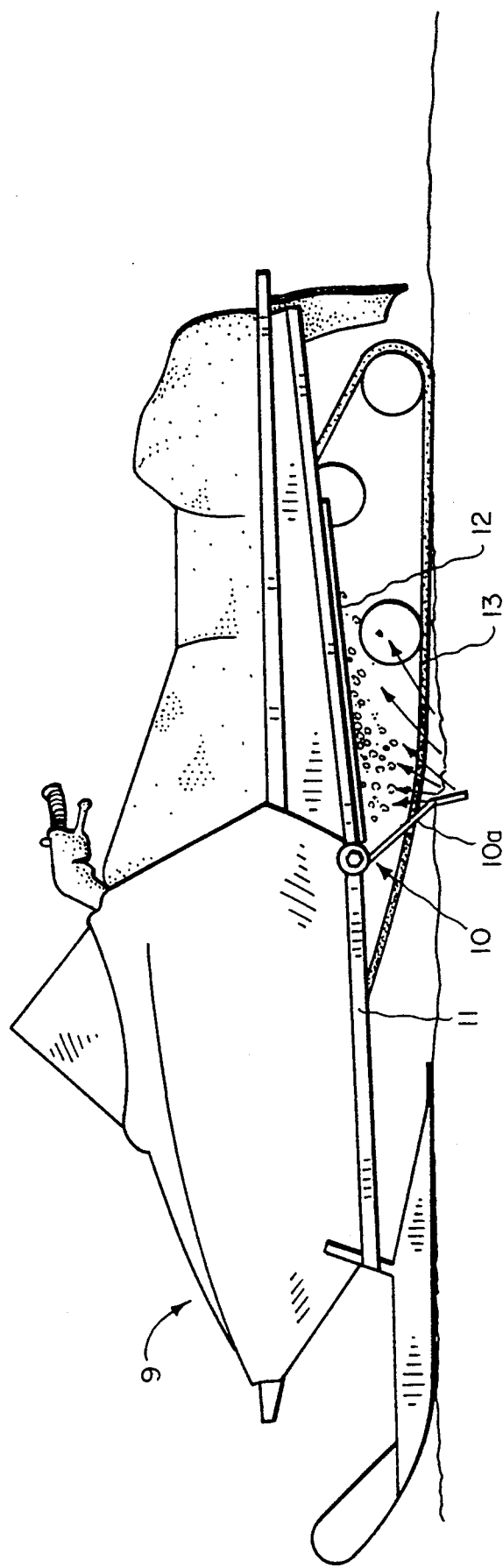
Figure 2:
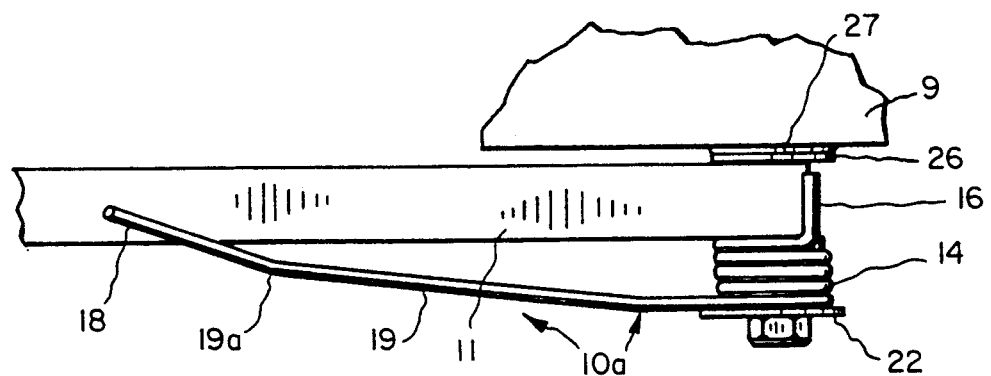

As shown in FIG. 1, a snow tiller 10 is attached to the side of a snowmobile 9, in this instance to the front suspension member 11 of the snowmobile, in close proximity to the heat exchanger 12 and the forward portion of the track 13. The snow tiller shown has as its primary member, a rigid, elongate metal rod 10a. In this instance, resilient means are provided for forcing the tiller into the snow by forming the intermediate portion of the rod into a coil, thus forming spring 14, shown in FIGS. 2 and 3. The end portion of the rod is bent to extend perpendicularly, laterally and outwardly from to the spring to form a catch arm 16. When the tiller is in the operating position, catch arm 16 is forced against front suspension member 11 and applies return force through the coil spring to press the opposite relatively long end portion or distal tip portion 18 of the tiller into the snow. Thus, as the snowmobile moves, the distal tip portion of the snow tiller digs into the snow thereby spraying the underneath of the snowmobile with snow. Spring 14 also provides resilience to the tiller to allow it to move without damage over hard objects such as rocks, which may be encountered. As shown in FIG. 2, when the tiller is mounted on the suspension member 11 on the outside of the snowmobile, the middle portion 19 of the rod is advantageously angled inwardly of the snowmobile to better position the distal tip portion with respect to the track and heat exchanger. The rod may be angled again at the end of the middle-portion so that the distal tip portion 18 will better dig into the snow and cause the desired spray.

It is preferable to mount the tiller so that it can be moved out of operating position when not needed. In the illustrated embodiment, when the tiller is not needed, it is simply rotated forwardly until the distal tip portion comes to rest on top of front suspension member 11, as shown in FIG. 2. It is generally necessary to apply outward pressure to the tip portion 18 of rod 10a so that the tip portion will clear suspension member 11. When the pressure on tip 18 is released, it will move to the position shown over suspension member 11 and prevent rod 10a from rotating downwardly into operating position until outward pressure is again applied to tip 18 to move it outwardly to clear suspension member 11. Various other means could be used to hold rod 10a out of operating position when not needed.

Figure 3:
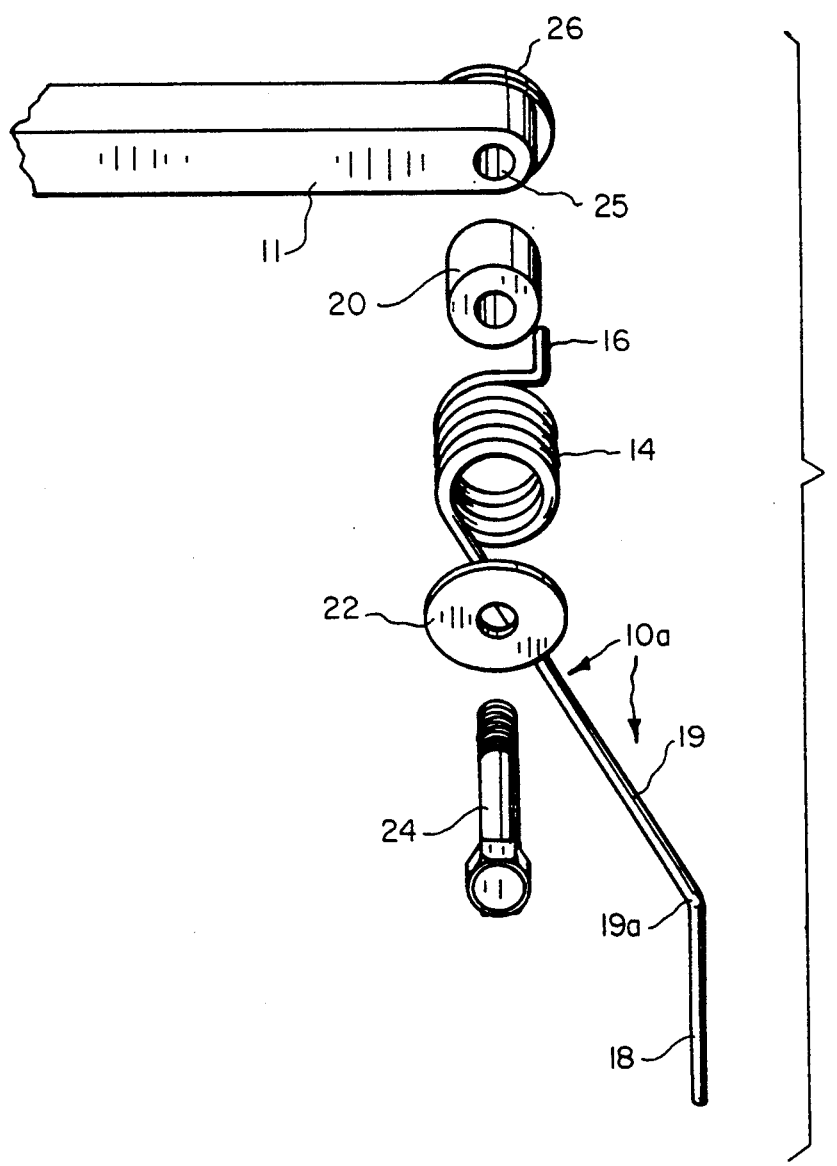

The tiller includes attachment means, shown in FIG. 3, in the form of cylindrical member 20 and washer 22, each having a central hole therethrough, and a bolt 24. For some model snowmobiles, particularly the Indy models of Polaris snowmobiles, the tiller can be easily mounted in cooperation with the normal pivotal attachment of suspension member 11 to the snowmobile. For such attachment, the bolt normally holding suspension member 11 to the snowmobile is removed. Longer bolt 24, is inserted through washer 22 and through the central hole in cylindrical member 20 which is positioned in the coiled portion 14 of the tiller whose height corresponds to the space inside the coiled portion, and bolt 24 is then passed through receiving hole 25 in front suspension member 11, washer 26, and is secured to mounting pad 27 of snowmobile 9.

Generally, for best results, a tiller is secured on each side of the snowmobile so snow is sprayed on the heat exchanger and track from both sides. For snowmobiles where such easy mounting is not possible, other bracket means may be used and the particular bracket configuration and mounting arrangement will vary with the model of snowmobile on which the tiller is mounted. In some cases, the bracket means itself will provide a stop for catch arm 16 to apply pressure to tip 18 forcing it into the snow, and will also provide a means for holding the arm out of operating position when not needed. The important thing in mounting the tillers is that they be positioned so that snow is sprayed onto the heat exchangers and/or track.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A snow tilling implement for attachment to a snowmobile, comprising:
   a rigid elongated member, an intermediate portion of which is formed into a coil spring having more than one turn and an end portion thereof extending perpendicularly, laterally, and outwardly from said spring portion to form a relatively short catch arm adapted to abut against the snowmobile and to exert return force through said coil spring so as to force the opposite relatively long end portion to said elongate member downwardly, said elongate member having a middle portion being angled in the direction of said short end so as to rest against the snowmobile when retracted;
   a cylindrical member of a height which just fits inside said coil for insertion into the coil of said spring and having a central hole therethrough;
   a washer slightly larger in diameter than said coil for abutting against said coil and enclosing the cylindrical member therein; and
   a bolt for insertion through said washer, said cylindrical member, and said coil for securing said elongate member to a snowmobile.

2. A snowmobile with a snow tilling attachment for spraying snow onto elements of the snowmobile that require snow thereon for cooling and lubrication, comprising:
   a snowmobile having elements thereof that require snow thereon for cooling and lubrication and including a snowmobile body having opposite sides, suspension members for respective opposite sides of the snowmobile body, each of said suspension member extending forwardly of a pivotal attachment to the corresponding side of the snowmobile body, said pivotal attachment being made by a bolt passing through a suspension member and into the snowmobile body;
   a pair of elongate members, each having opposite end portions, one end portion being relatively short and the other being relatively long and having a tip, an intermediate portion, and a middle portion wherein the intermediate portion is formed into a coil spring for forcing the tip of the relatively long end portion into the snow to contact, break up, and spray snow behind the tip when the snowmobile is in motion and the relatively short end portion is formed into a perpendicular extension to said spring so as to form a catch arm; and
   a pair of attachment means including a pair of washers which are slightly larger in diameter than said coil springs and which abut against the coil springs and a pair of cylindrical members each of which snugly fits inside a coil spring, each washer and each cylindrical member having a central hole therethrough for receiving the bolt attaching the suspension member to the snowmobile body by such bolt passing through the central hole through the washer and cylindrical member of the tiller attachment means, then through the suspension member and into the snowmobile body; said attachment means allowing the elongate member to swivel in an up position out of the way when the elongate member is not needed and in a down, operating position when the elongate member is needed.

3. The snowmobile with a snow tilling attachment for spraying snow onto elements of the snowmobile that require snow thereon for cooling and lubrication according to claim 2, wherein each suspension member has an upper surface, and the catch arm bears against the upper surface of the suspension member when the elongate member is in operating position.

4. The snowmobile with a snow tilling attachment for spraying snow onto elements of the snowmobile that require snow thereon for cooling and lubrication according to claim 3, wherein the elongate member is held out of operating position when desired by the elongate member tip and resting on the upper surface of the suspension member.

* * * * *